(12) United States Patent
Sanders et al.

(10) Patent No.: US 8,352,937 B2
(45) Date of Patent: Jan. 8, 2013

(54) STREAMING AN APPLICATION INSTALL PACKAGE INTO A VIRTUAL ENVIRONMENT

(75) Inventors: James Sanders, Pacifica, CA (US); Ryan M. McCarten, Redwood City, CA (US)

(73) Assignee: Symantec Corporation, Mountain View, CA (US)

( * ) Notice: Subject to any disclaimer, the term of this patent is extended or adjusted under 35 U.S.C. 154(b) by 691 days.

(21) Appl. No.: 12/534,772

(22) Filed: Aug. 3, 2009

(65) Prior Publication Data

US 2011/0029968 A1 Feb. 3, 2011

(51) Int. Cl.
*G06F 9/445* (2006.01)

(52) U.S. Cl. ........ 717/178; 717/174; 717/175; 717/176; 717/177

(58) Field of Classification Search .......... None
See application file for complete search history.

(56) References Cited

U.S. PATENT DOCUMENTS

| | | | |
|---|---|---|---|
| 5,403,639 A * | 4/1995 | Belsan et al. ................ | 1/1 |
| 5,487,167 A | 1/1996 | Dinallo et al. | |
| 5,581,764 A | 12/1996 | Fitzgerald et al. | |
| 5,708,796 A | 1/1998 | Ozden et al. | |
| 5,712,976 A | 1/1998 | Falcon, Jr. et al. | |
| 5,742,768 A | 4/1998 | Gennaro et al. | |
| 5,745,380 A | 4/1998 | Sandvoss et al. | |
| 5,754,774 A | 5/1998 | Bittinger et al. | |
| 5,761,477 A | 6/1998 | Wahbe et al. | |
| 5,764,235 A | 6/1998 | Hunt et al. | |
| 5,765,164 A | 6/1998 | Prasad et al. | |
| 5,787,284 A | 7/1998 | Blainey et al. | |
| 5,802,292 A | 9/1998 | Mogul | |
| 5,835,749 A | 11/1998 | Cobb | |
| 5,878,223 A | 3/1999 | Becker et al. | |
| 5,919,247 A | 7/1999 | Van Hoff et al. | |

(Continued)

FOREIGN PATENT DOCUMENTS

WO WO97/00475 1/1997

(Continued)

OTHER PUBLICATIONS

Yang Yu, et al: "A Feather-weight Virtual Machine for Windows Applications"; Jun. 14, 2006; pp. 24-34.

(Continued)

*Primary Examiner* — Henry Tsai
*Assistant Examiner* — Jing-Yih Shyu
(74) *Attorney, Agent, or Firm* — Rory D. Rankin; Meyertons, Hood, Kivlin, Kowert & Goetzel, P.C.

(57) ABSTRACT

A system and method for streaming an install package into a virtual environment. The system includes a server and a client. The server streams an install package to the client as a series of streamlets. The client starts an installer component in a suspended state outside the virtual environment. The client registers the installer component in the virtual environment and initiates execution of the installer component in the virtual environment to receive portions of the install package and install the received portions of the install package in the virtual environment. During package installation, a virtualization manager detects an attempt to execute a call to a file system and confines file system changes resulting from the call to the virtual environment in response to determining that the attempt was made by the installer component and the installer component is registered in the virtual environment.

19 Claims, 9 Drawing Sheets

U.S. PATENT DOCUMENTS

| | | | |
|---|---|---|---|
| 5,933,644 | A | 8/1999 | Wallace |
| 5,974,129 | A | 10/1999 | Bodnar |
| 5,978,788 | A | 11/1999 | Castelli et al. |
| 5,978,791 | A | 11/1999 | Farber et al. |
| 6,003,087 | A | 12/1999 | Housel, III et al. |
| 6,009,410 | A | 12/1999 | LeMole et al. |
| 6,073,129 | A | 6/2000 | Levine et al. |
| 6,088,524 | A | 7/2000 | Levy et al. |
| 6,122,628 | A | 9/2000 | Castelli et al. |
| 6,286,037 | B1 * | 9/2001 | Matsuura ............ 709/220 |
| 6,311,221 | B1 | 10/2001 | Raz et al. |
| 6,757,894 | B2 * | 6/2004 | Eylon et al. ............ 717/177 |
| 7,567,994 | B2 * | 7/2009 | Adkins et al. ............ 1/1 |
| 7,735,057 | B2 | 6/2010 | Rachman et al. |
| 2002/0087717 | A1 * | 7/2002 | Artzi et al. ............ 709/236 |
| 2002/0174215 | A1 * | 11/2002 | Schaefer ............ 709/224 |
| 2004/0230971 | A1 * | 11/2004 | Rachman et al. ............ 717/175 |
| 2004/0267835 | A1 * | 12/2004 | Zwilling et al. ............ 707/202 |
| 2005/0114870 | A1 * | 5/2005 | Song et al. ............ 719/328 |
| 2007/0074192 | A1 * | 3/2007 | Geisinger ............ 717/148 |
| 2008/0010630 | A1 * | 1/2008 | Ou-Yang et al. ............ 717/121 |
| 2008/0229041 | A1 * | 9/2008 | Baek et al. ............ 711/163 |
| 2008/0281884 | A1 * | 11/2008 | Subrahmanyam ............ 707/205 |

FOREIGN PATENT DOCUMENTS

| | | |
|---|---|---|
| WO | WO97/46955 | 12/1997 |
| WO | WO98/11723 | 3/1998 |

OTHER PUBLICATIONS

International Search Report and Written Opinion for International Application No. PCT/US2010/044163 mailed Dec. 17, 2010.

Japanese Patent Application Laid-open No. Sho 64-36332, Feb. 7, 1989.

Japanese Patent Application Laid-open No. Hei 10-162057, Jun. 19, 1998.

G. Glass, "A Universal Streaming Service", C++ Report, Apr. 1996, pp. 74-76 and 81-83.

T. Ritchey, "Java!", New Riders Publishing, Dec. 1995, pp. 214-216.

Chen, Z. et al., (Dec. 11-14, 1995) "Real time video and audio in the world wide web" World Wide Web Journal, Fourth International World Wide Web Conference, pp. 333-348.

Jiang, Z. and Kleinrock, L. (1997) "Prefetching links on the WWW" IEEE International Conference on Communications (ICC), US, New York, NY: IEEE, pp. 483-489.

M. Schwartz, "Telecommunication Networks: Protocols, Modeling and Analysis", Jan. 1, 1987; Addison-Wesley Publishing Company, pp. 266-283.

J. Basu et al., "Degrees of Transaction Isolation in SQL *Cache: A Predicate-based Client-side Caching System", May 15, 1996, pp. 1-22.

Amit Shukla et al., "Storage Estimation for Multidimensional Aggregates in the Presence of Hierarchies", VLDB Conference Mumbai (Bombay), 1996, pp. 522-531.

Dale Skeen, "New Forms Of Persistent Queries Are Necessary To Handle Live Business Data As It Speeds Through A Company", internet website www.byte.com BYTE Magazine, Feb. 1998, 5pgs.

V. Hoff et al., "The Open Software Description Format (OSD)", internet website www.w3.org, Aug. 11, 1997, pp. 1-13.

Red Brick Vista, "Aggregate Computation and Management", internet website www. informix.com, printed Oct. 4, 2000.

Fireclick, "Web Site Performance is Key to E-Commerce Sucess", internet website WWW. Fireclick.com printed, Nov. 1, 2000.

Boost Web Optimizer Technology Overview, "How it Works", Sep. 27, 2000 and internet website www.boostworks.com printed Nov. 1, 2000.

"Delivering Windows to the Net White Paper", WinToNet by Menta Software, 2000 and Website http://216.205.21.102/ printed Nov. 1, 2000.

"First There was Streaming Audio, then Streaming Video. Now get ready for Streaming Software", Stream Theory White paper and Website WWW.Streamtheory.com printed Sep. 22, 2000.

"OSD Describing Software Package on the Internet", Marimba Inc. White paper 1998 and wedsite www.marimba. com, printed Nov. 1, 2000.

"Timbale for Windows Terminal Services" Marimba Promotional document, undated, 2000.

Japanese Patent Application Laid-open No. Hei 8-51596, Feb. 20, 1996.

Japanese Patent Application Laid-open No. Hei 10-91446, Apr. 10, 1998.

Japanese Patent Application Laid-open No. Hei 7-271603, Oct. 20, 1995.

Japanese Patent Application Laid-open No. Hei 8-6878, Jan. 12, 1996.

Japanese Patent Application Laid-open No. Hei 10-133976, May 22, 1998.

* cited by examiner

STREAMING AN APPLICATION INSTALL PACKAGE INTO A VIRTUAL ENVIRONMENT

BACKGROUND OF THE INVENTION

1. Field of the Invention

This invention generally relates to installing files in a computing system. More particularly, the invention relates to a system and method for streaming an install package into a virtual environment.

2. Description of the Related Art

A common method of installing software in computing systems is via an installation package containing installation information and, often, the files that make up the software itself. For example, in computing systems running the Microsoft Windows® operating system, an install package commonly referred to as an MSI install package may be used. The term "MSI" comes from the default file extension of these installation packages. Install packages may be commonly delivered via removable storage media or via network download.

In some cases, an install package may also be delivered to a target system via streaming. "Streaming" in this context generally refers to a form of on-demand software distribution in which an application is downloaded from a server, or other host, to a target in response to a request (demand) from the target. Such a software application may be referred to as a "streamed application." Such techniques may include initially streaming only those portions of an application necessary to install and begin execution of the application with basic or otherwise required functionality. In this manner, the entire application need not be downloaded to a target computing system prior to beginning execution of the application. If other portions of the application are needed, they may be delivered in the background or on demand through the same streaming mechanism. For example, the server computer may first stream one or more startup blocks which include just enough executable code for the streamed application to be launched on the host computer. Upon receiving the startup blocks, the host computer may execute the startup blocks to launch the streamed application. Further blocks of code or data for the streamed application may then be dynamically streamed to the host computer from the server computer while the streamed application is executing.

In some cases, an install package may be conveyed to a target computing system. Once the install package is received, one or more installation components may be employed to install the install package. For example, the Windows Installer Service and an MSI executable process may generally operate in the environment of the physical operating system of the target computing system according to standard Microsoft recommended practices. However, there may be times when it is desired to install an install package in a virtual environment on a target computing system. Accordingly, systems and methods of streaming an install package into a virtual environment are desired.

SUMMARY OF THE INVENTION

Various embodiments of a system and method for streaming an install package into a virtual environment are contemplated.

According to some embodiments, a system may include a server and a client. The client starts an installer component in a suspended state outside the virtual environment. For example, various operating systems provide utilities for suspending threads and/or processes. Such mechanisms may be utilized to either begin execution and immediately suspend processes and/or threads. Alternatively, it may be possible to start a process in a suspended state. Either way may be referred to as starting the installer component in a suspended state. Subsequently, the client registers the installer component in the virtual environment and initiates or resumes execution of the installer component in the virtual environment to begin installation of the package into the virtual environment. During installation of the received portion, a virtualization manager detects an attempt to execute a call to a file system. In response to determining that the attempt was made by the installer component and the installer component is registered in the virtual environment, the virtualization manager confines any file system changes that result from execution of the call to the virtual environment.

In one embodiment, the installer component includes an installer service and an installer executable process. The client starts the executable process outside the virtual environment in a suspended state and subsequent to registering the installer executable process in the virtual environment, changes the state from suspended to active. Subsequent to installing the received portion of the install package in the virtual environment the client unregisters the installer service from the virtual environment and registers the installer service in a different environment. In a further embodiment, the client receives instructions from the server that identify a virtual environment into which to install the install package. In a still further embodiment, the server streams the install package to the client as a series of streamlets. The installer component extracts a file from a streamlet and issues a write request to write the file into the virtual environment. A driver, which may be outside of the virtual environment, intercepts the write request. In response to intercepting the write request, the driver determines if the file is a "sparse" file which does not include all of the file's data. If the file is a sparse file, the driver registers the file as a sparse file and allocates an amount of storage space sufficient to store the corresponding non-sparse file. In various embodiments, a sparse file includes a marker that includes data identifying a location from which data or code may be retrieved and in response to detecting a read request to read a sparse file, the driver conveys a demand/request to the location identified in the marker for the additional code or data and stores the retrieved code or data to the file. Embodiments are contemplated in which the driver is located on either the client or the server.

Also contemplated is a method of streaming an install package into a virtual environment which includes starting an installer component in a suspended state outside the virtual environment. Subsequent to starting the installer component, the method further includes registering the installer component in the virtual environment and initiating execution of the installer component in the virtual environment to receive at least a portion of an install package and install the received portion of the install package in the virtual environment. During installation of the received portion, the method further includes detecting an attempt to execute a call to a file system. The method further includes confining file system changes resulting from execution of the call to the virtual environment in response to determining that the attempt was made by the installer component and the installer component is registered in the virtual environment.

In a still further embodiment, a computer-accessible storage medium stores first program instructions executable by a client computing system to start an installer component in a suspended state outside the virtual environment. Subsequent to starting the installer component, the first program instructions are further executable by a client computing system to register the installer component in the virtual environment and initiate execution of the installer component in the virtual environment to receive at least a portion of an install package and install the received portion of the install package in the virtual environment. During installation of the received portion, the first program instructions are further executable to detect an attempt to execute a call to a file system. The first program instructions are further executable to confine file system changes resulting from execution of the call to the virtual environment in response to determining that the attempt was made by the installer component and the installer component is registered in the virtual environment.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
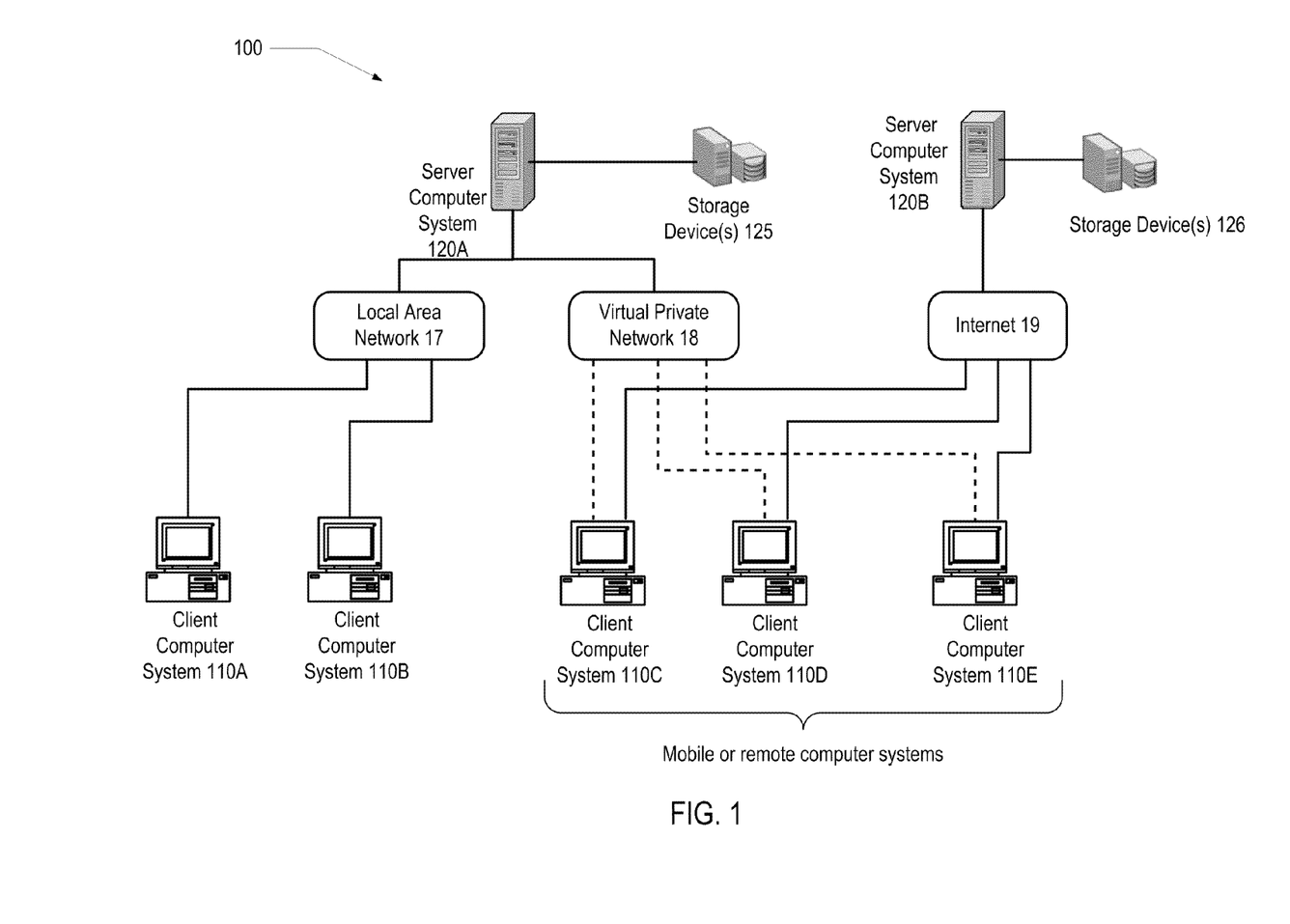
FIG. 1 illustrates one embodiment of a computing system for streaming an install package into a virtual environment.

Various embodiments of a system and method for streaming an install package into a virtual environment are described herein. FIG. 1 illustrates one embodiment of such a system. In the embodiment shown, the system includes client computing systems 110A-110E and server computing systems 120A and 120B. As used herein, elements referred to by a reference numeral followed by a letter may be collectively referred to by the numeral alone. For example, client computing systems 110A-110E may be collectively referred to as client computing systems 110. Server computing system 120A is coupled to storage device(s) 125 and server computing system 120B is coupled to storage device(s) 126. Client computing systems 110 and server computing systems 120 may be interconnected through various network elements. For example, client computing systems 110A and 110B are shown coupled to server computing system 120A via a local area network 17, client computing systems 110C, 110D, and 110E are shown coupled to server computing system 120A via a virtual private network 18 and to server computing system 120B via Internet 19. In this embodiment, client computing systems 110C-110E may be mobile and/or remote computing systems. In various embodiments the system may include any number and any type of client computing systems 110 and/or server computing systems 120. Client computing systems 110 are representative of any number of stationary computers and/or mobile computing devices such as laptops, handheld computers, television set top boxes, home media centers, telephones, etc. Client computing systems 110 and server computing systems 120 may operate as peers in a peer-to-peer configuration, as clients and servers in a client/server configuration, or a combination or peer-to-peer and client/server configurations. Each client computer 110 may, for example, be used by a particular user or member of a business or other organization, a home user(s), or otherwise.

In alternative embodiments, the number and type of computing systems and network elements is not limited to those shown in FIG. 1. Almost any number and combination of server, desktop, and mobile computing systems or devices may be interconnected in system 100 via various combinations of modem banks, direct LAN connections, wireless connections, WAN links, etc. Also, at various times one or more computing systems may operate offline. In addition, during operation, individual computing system connection types may change as mobile users travel from place to place connecting, disconnecting, and reconnecting to system 100. In one embodiment, computing system 100 or a portion thereof may be implemented as part of a cloud computing environment.

In one embodiment, server computing systems 120 may store one or more software applications on storage devices 125, 126, etc. During operation, each of the client computing systems 110 may obtain, install, and execute one or more of these software applications via server computing systems 120. For example, software applications obtained by client computing systems 110 may include e-mail, word processing, spreadsheet, and other office productivity applications, specialized applications for handling graphics, images, audio files, video files, performing numeric calculations and the like. Numerous other software applications are known and are contemplated.

Figure 2:
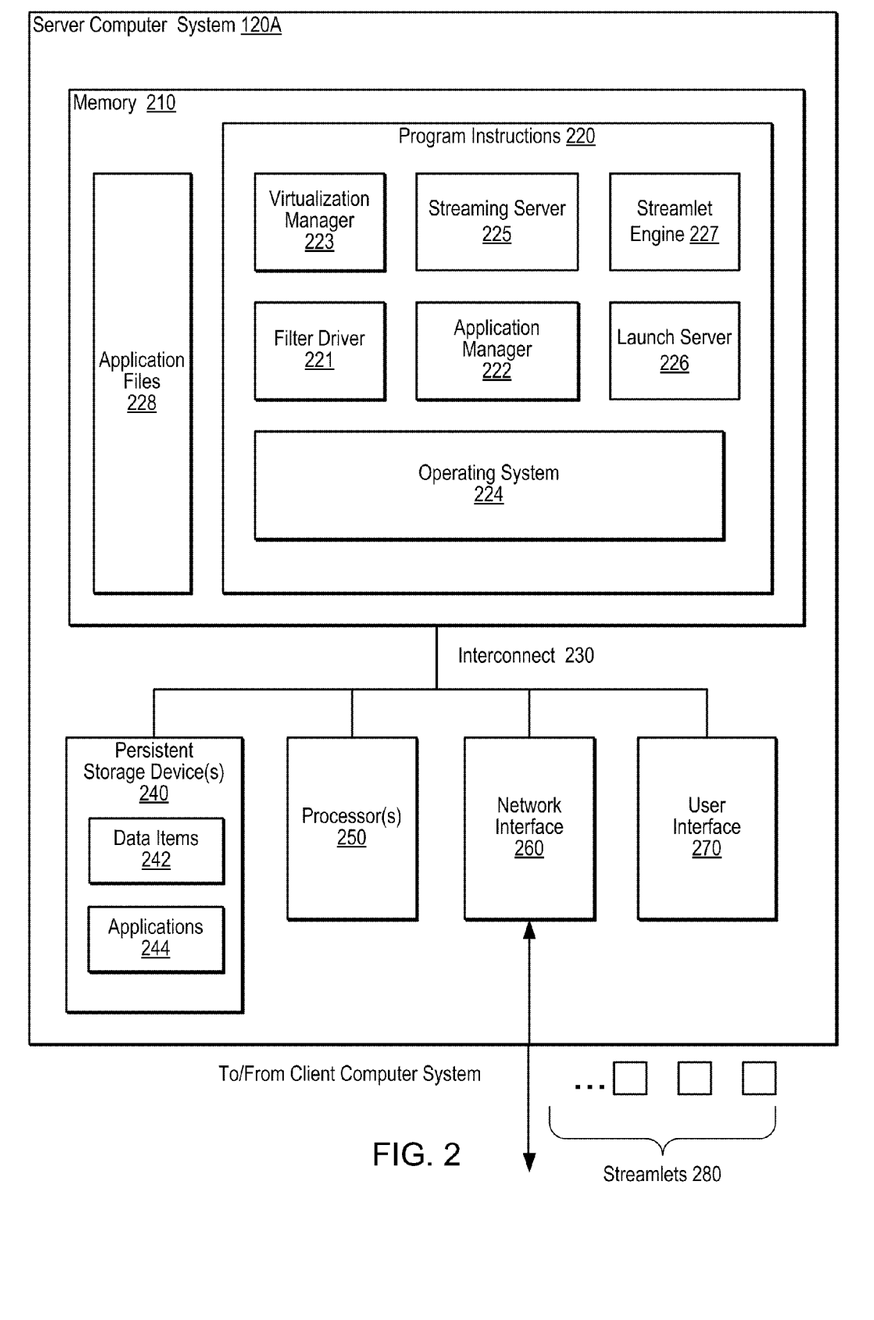
FIG. 2 illustrates one embodiment of a server computing system.

In one embodiment, software applications may be conveyed from a server computing system 120 to a client computing system 110 via streaming. FIG. 2 illustrates one embodiment of a server computing system 120A. It is noted that FIG. 2 is provided as an example for purposes of discussion, and in other embodiments the server computing system 120A may take on various other forms. Server computing system 120A may be representative of any of server computing systems 120 described herein. Similarly, server computing system 120A may be used to implement any of the below-described methods. Server computing system 120A may be any of various types of devices, including, but not limited to, a personal computing system, desktop computer, laptop or notebook computer, mainframe computing system, handheld computer, workstation, network computer, a consumer device, application server, storage device, a peripheral device such as a switch, modem, router, etc, or in general any type of computing device.

Server computing system 120A may include one or more processors 250, each of which may include one or more cores, any of which may be single or multi-threaded. Server computing system 120A may also include one or more persistent storage devices 240 (e.g. optical storage, magnetic storage, hard drive, tape drive, solid state memory, etc), which may include various data items 242 (e.g., files) and/or applications 244. Example applications include databases, email applications, office productivity applications, and a variety of others as known in the art. Server computing system 120A may include one or more memories 210 (e.g., one or more of cache, SRAM, DRAM, RDRAM, EDO RAM, DDR RAM, SDRAM, Rambus RAM, EEPROM, etc.). Server computing system 120A may also include one or more network interfaces 260 for transmitting and receiving data, such as to or from client computing systems 110, as described herein. Server computing system 120A may further include one or more user interfaces 270 for receiving user input or displaying output to users, such as a keyboard, mouse or other pointing device, touch screen, and a monitor or other visual display device. Various embodiments may include fewer or additional components not illustrated in FIG. 2 (e.g., video cards, audio cards, additional network interfaces, peripheral devices, a network interface such as an ATM interface, an Ethernet interface, a Frame Relay interface, etc.). In various embodiments, storage devices 240, processors 25, network interface 260, and user interface 270 may be coupled to one another and memory 210 via an interconnect 230.

One or more of the system memories 210 may contain program instructions 220. Program instructions 220 may be encoded in platform native binary, any interpreted language such as Java® byte-code, or in any other language such as C/C++, Java®, etc or in any combination thereof. According to the illustrated embodiment, program instructions 220 may comprise specific modules executable to implement one or more operating systems 224, such as the Windows® operating system, the Solaris® operating system, and/or the Linux® operating system. In addition, program instructions 220 may include modules to implement one or more of a filter driver 221, an application manager 222, a virtualization manager 223, a streaming server 225, a launch server 226, and streamlet engine 227. One or more of the system memories 210 may also contain application files 228. Program code included in program instructions 220 can be combined together or separated into various modules as desired, according to a particular embodiment. Similar to server 120A, clients may include any of a variety of storage types, interfaces, types of program code, and so on.

During operation, launch server 226 may be used to view applications that are available to be streamed and to select an application to be streamed to a client computing system (e.g., client computing system 110 of FIG. 1). An application that is chosen for streaming may be converted to a series of streamlets 280 by streamlet engine 227. Streamlets, as used herein, are blocks into which an application is divided such that blocks of program code and/or data that are needed to run the application are transmitted first, thereby allowing the application to be launched with reduced latency. In one embodiment, streamlets may be 4 Kbyte blocks. Once streamlet engine 227 has generated streamlets 280, they may be delivered to client computing system 110 by streaming server 225. In one embodiment, streamlet engine 227 may convey streamlets to a client computing system irrespective of an environment in the client computing system targeted for installation of the streamlets. In various embodiments, streamlet engine 227 may add a tag to each streamlet that identifies a particular environment in the client computing system in which the software application corresponding to the streamlet is to be installed.

Various types of software applications may be converted to streamlets by streamlet engine 227. In one embodiment, software applications that have first been converted to install packages prior to conversion to streamlets may be streamed to a client. An install package, as used herein, refers to a set of files that have been organized into a package that may be received and processed by an installation component. For example, the Windows® Installer Service is a well known service that may be used to install, maintain, and remove MSI install packaged software applications—typically on a system that uses a Microsoft Windows operating system. An install package may include files corresponding to one or more software products.

In one embodiment, the functions of application manager 222, virtualization manager 223, and filter driver 221 may be replaced by a corresponding application manager, virtualization manager, and filter driver located on a client computing system that perform functions that are described in detail below (e.g., application manager 322, virtualization manager 323, and filter driver 321 in FIG. 3). In an alternative embodiment, the functions of client-side versions of application manager 322, virtualization manager 323, and filter driver 321 may be performed on the server by application manager 222, virtualization manager 223, and filter driver 221. Various combinations of where such components are located are possible and are contemplated.

Figure 3:
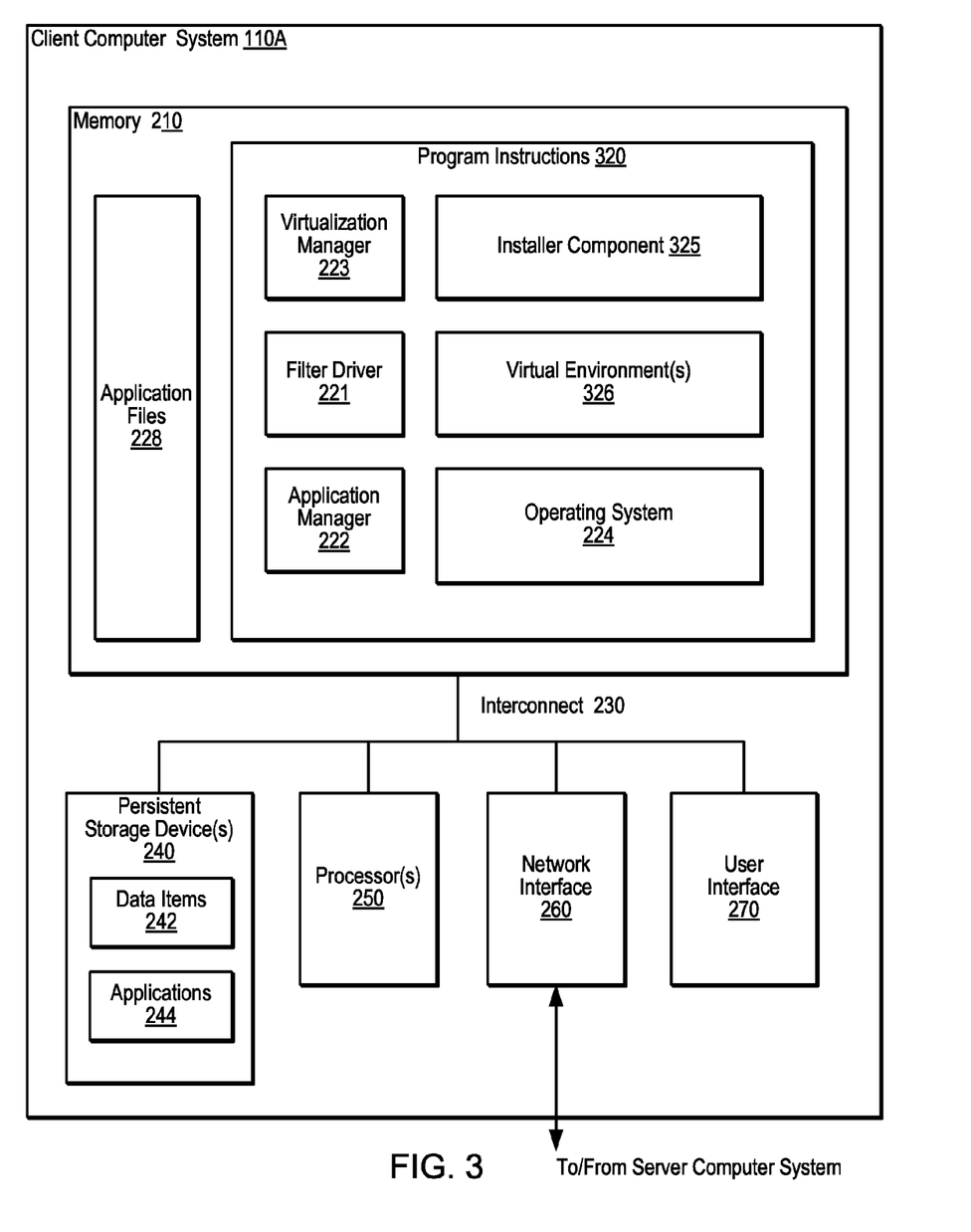
FIG. 3 is a block diagram of one embodiment of a client computing system that may receive a streamed install package.

Turning now to FIG. 3, a block diagram of one embodiment of a client computing system 110A that may receive a streamed install package is shown. Items shown in FIG. 3 which are similar to those shown in FIG. 2 utilize the same reference numerals. It is noted that FIG. 3 is provided as an example, and in other embodiments the client computing system 110A may take on various other forms. Client computing system 110A may be representative of any of client computing systems 110 described herein. Similarly, client computing system 110A may be used to implement any of the below-described methods. Client computing system 110A may be any of various types of devices, including, but not limited to, a personal computing system, desktop computer, laptop or notebook computer, mainframe computing system, handheld computer, workstation, network computer, a consumer device, application server, storage device, a peripheral device such as a switch, modem, router, etc, or in general any type of computing device.

During operation, in one embodiment, application manager 322 may generate a request to receive a streamed install package corresponding to a software application that is to be installed on a client computing system. In response to a request, application manager 322 may receive streamlets 280 that correspond to the requested package. In some embodiments, Application manager 322 may temporarily store each received streamlet in a local buffer or memory (not shown). If the requested software application is targeted to be installed in system (non-virtual) environment 410, application manager 322 may cause Installer Component 325 to install the install package into system environment 410. For example, Windows Installer Service, an installation and configuration service provided by Microsoft Windows, may be used to install MSI install packages. In other embodiments, an alternative service may be utilized to perform installation and configuration services. In one embodiment, installer component 325 includes an installer service that performs a series of actions specified by sequence tables in an installation database. These actions may generate a script that provides instructions for performing the installation. The installer service may then send the generated script for execution to another component of installer component 325 that uses the generated script to perform installation operations. For example, Windows Installer Service and MSI Executable may perform the functions of installer component 325.

Figure 4:
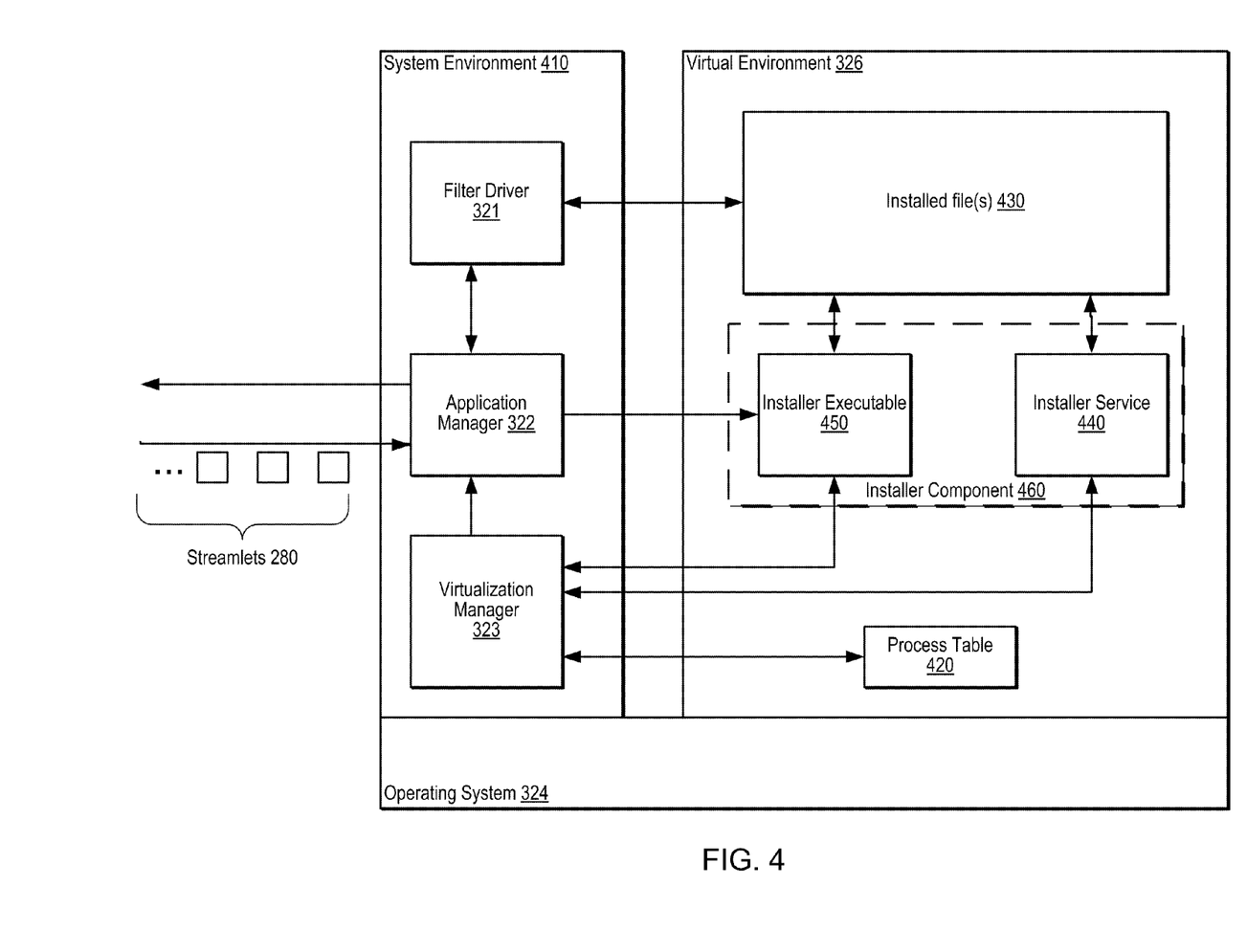
FIG. 4 is a detailed block diagram of one embodiment of components used to install a streamed install package.

FIG. 4 is a detailed block diagram of one embodiment of components used to install a streamed install package. Components illustrated in FIG. 4 may operate on client computing system 110A as shown in FIG. 3. Included in the components of FIG. 4 are operating system 324, a system environment 410, and virtual environment 326. In this embodiment, system environment 410 includes filter driver 321, application manager 322, and virtualization manager 323. In this embodiment, virtual environment 326 includes installed file(s) 430, Installer Service ("Service") 440, Installer Executable "Executable") 450, and a process table 420. In some embodiments, the functions of Service 440 and Executable 450 may be combined in a single, or more than two, components. Windows-specific components may be used for purposes of discussion herein. In alternative embodiments, other install packages and installer components may be used instead.

Application manager 322 is shown coupled to request a streamed application and receive streamlets 280 from a suitable source of streamed applications, such as a server computing system 120. Application manager 322 may be further coupled to virtualization manager 323 and to filter driver 321. Application manager 322 may also be coupled to Executable 450 for delivering streamed application files for installation. Virtualization manager 323 is shown coupled to a process table 420 that may be used to register and maintain a record of processes configured to operate within virtual environment 326. Virtualization manager 323 is further shown coupled to Installer Service 440 and Executable 450 for managing their registration status. Filter driver 321 is shown coupled to installed file(s) 430 and may be used to manage writing and reading installed file(s) 430 within virtual environment 326. Installer Service 440 and Executable 450 may each be coupled to installed file(s) 430 on which to perform install and uninstall operations. In one embodiment, Installer Service 440 and Executable 450 may be elements of an installer component 460.

During operation, if the requested software application is targeted to be installed in a virtual environment, such as virtual environment 326, it may be desirable to prevent Installer Service 440 and Executable 450 from affecting the configuration of system environment 410 or operating system 324. For example, Installer Service 440 may be provided by operating system 324 as a service that may be configured to run in system environment 410 or in a virtual environment such as virtual environment 326. Various actions performed by Installer Service 440 including file system writes and changes to the operating system registry may have an effect on the environment in which Installer Service 440 is running. A scenario will now be described including additional steps to confine the effects of Installer Service 440 and Executable 450 to a particular virtual environment.

In one embodiment, Installer Service 440 may be a process that is initially running outside of the virtual environment 326 (e.g., in the system environment 410) that makes a call to start Executable 450 to be used in an install operation. If the requested software application is targeted to be installed in a virtual environment, such as virtual environment 326, virtualization manager 323 may change the operating environment of Installer Service 440 and/or Executable 450 from the system environment 410 to the virtual environment. In one embodiment, changing the operating environment of Service 440 and/or Executable 450 may comprise registering them in the virtual environment 326. Registering Installer Service 440 and Executable 450 in a virtual environment may allow virtualization manager 323 to isolate the effects of actions performed by Installer Service 440 and Executable 450 to the target virtual environment, as described further below. In this manner, one or more changes to the virtual environment 326 may not affect the system environment 410.

In one embodiment, a target environment (e.g., a virtual or non-virtual environment) in which to install a software application may be determined on the client computing system, such as via a user selection. In an alternative embodiment, in order to identify a target environment in which to install a software application, application manager 322 may request and receive a set of rules from server computing system 120 that indicate, among other things, whether or not to install a software application into a particular environment.

In one embodiment, virtualization manager 323 may manage processes that are registered in virtual environment 326. For example, virtualization manager 323 may maintain a list of processes that have been registered in virtual environment 326 within a process table 420. In the embodiment shown, process table 420 is shown within virtual environment 326. However, in other embodiments, process table 420 may be located elsewhere. Once each of Installer Service 440 and Executable 450 has been registered in virtual environment 326, a corresponding entry may be added to process table 420. Virtualization manager 323 may be configured to monitor the operation of any of the processes operating on a client computing system such as client system 110A. In one embodiment, if virtualization manager 323 detects a process call that corresponds to the virtualization environment 326, the virtualization manager 323 may cause the effects of the process to be maintained within the virtual environment 326. Alternatively, if virtualization manager 323 detects a process call that corresponds to the system environment 410, the virtualization manager 323 may permit the effects of the process to affect the system environment.

In one embodiment, process table 420 may associate an indication with each process that indicates whether it is associated with a virtual environment 326 or other environment. In some embodiments, process table 420 may store only those processes registered with the virtual environment 326. In such embodiments, the mere presence of a process identifier within the process table 420 indicates it is associated with the virtual environment 326. For example, when a process makes a call to perform an operation such as a read or write to the file system, or seeks to make system or configuration changes (e.g., to the Windows registry), virtualization manager 323 may compare a process ID included in the call to process IDs stored in process table 420. In various embodiments, if the process making the call or its parent process has a corresponding process ID in process table 420, virtualization manager 323 may direct the call's operation to interact with the virtual environment only. Otherwise, if the process making the call or its parent process has does not have a corresponding process ID in process table 420, virtualization manager 323 may allow the call's operation to interact with the system environment. Accordingly, the effects of actions such as read and write requests to a file system or to the Windows registry by processes and their child processes that are registered in a virtual environment may be confined to the virtual environment.

In one embodiment, before Executable 450 is registered in virtual environment 326, it may be started in a suspended state as a process in the system environment. After Executable 450 has been registered, it may be triggered to begin execution. Subsequently, Installer Service 440 and Executable 450 may retrieve streamlets corresponding to the install package that have been received and extract one or more files to be written into virtual environment 326.

Figure 5:
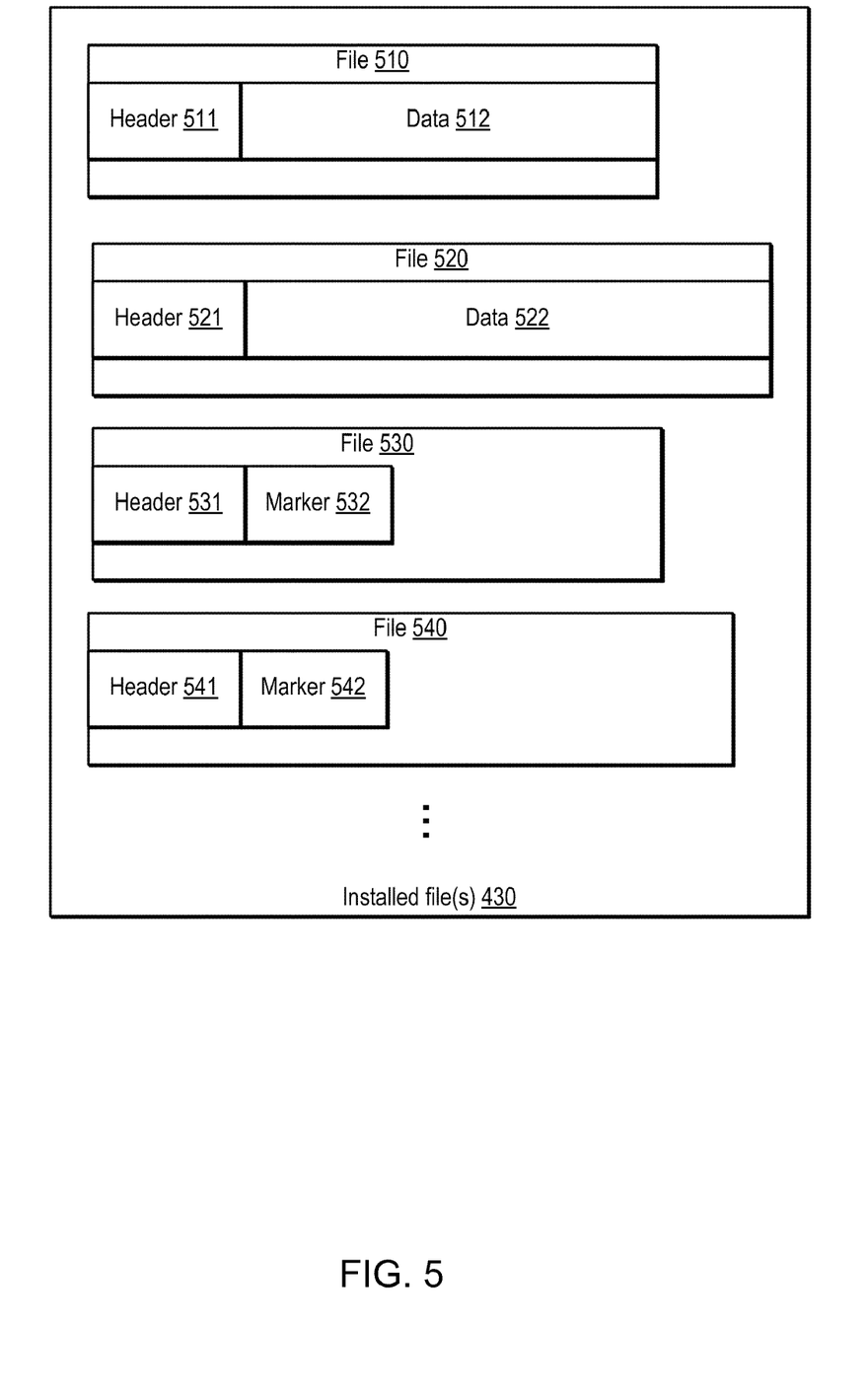
FIG. 5 illustrates one embodiment of installed files after extraction and installation.

As files are being extracted from the streamlets, filter driver 321 may monitor writes performed by Executable 450. If filter driver 321 detects an attempt by Executable 450 to write a file to virtual environment 326, it may intercept the write, determine if the file includes a marker or other indication that indicates not all of the file data is present (e.g., the file is a "stub file" or "sparse file" that stands in for the actual file). If a file includes a marker, filter driver 321 may allocate or reserve additional space for the file to allow for additional data or code to replace the marker in the file's storage location if and when the file is received. In one embodiment, filter driver 321 may also register the file as a sparse file, such as by maintaining and adding an entry including a file identifier to a table of sparse files. Alternatively, the stored sparse file itself may indicate the file data is not present. As used herein, reference to a file with a marker as described above may refer to any suitable type of stub file or sparse file. Those skilled in the art will appreciate there are many ways a file may be identified as such stub/sparse file. The effect of this transformation of sparse files is illustrated in FIG. 5, which is described further below. If a read is subsequently addressed to a sparse file, file driver 321 may initiate a request to retrieve the data corresponding to the file from a streaming server (or other location) via application manager 322. The retrieved data may then be used to service the read request—either before of after the retrieved data is written to a file system of the virtual environment. In one embodiment, a sparse file's marker may include data indicating the location from which further data corresponding to the file may be obtained, such as the location of a streaming server. For example, the marker may include an IP address and/or other address information. In such an embodiment, filter driver 321 may retrieve the file data from the location indicated in the marker of the file to which the read is addressed.

Installer Service 440 and Executable 450 may continue to retrieve streamlets and install corresponding files into virtual environment 326 until all files, or enough files (e.g., a predetermined selection), have been installed to execute the corresponding software application. However, as long as Installer Service 440 is registered in virtual environment 326, if a user or process attempts to use Installer Service 440 to perform an installation in another virtual or non-virtual environment, the effects of Installer Service 440 may be seen in virtual environment 326, causing the effects to "leak" across environment boundaries. In one embodiment, to prevent such leaking across environment boundaries upon completion of an installation of an install package, Installer Service 440 and/or Executable 450 may be unregistered from virtual environment 326. Unregistering Installer Service 440 and Executable 450 from virtual environment 326, for example, by removing their corresponding process IDs from process table 420, may allow them to be registered in another environment and used to install other installation packages into other target environments, either virtual or non-virtual.

FIG. 5 illustrates one embodiment of installed files 430 after extraction and installation. In the illustrated embodiment, installed files 430 include files 510, 520, 530, and 540, etc. that represent any number of files that may be extracted from streamlets or otherwise made available to be installed in a target environment. In this embodiment, file 510 includes a header 511 and data 512. Header 511 may include items such as a file ID and the size of the file. Data 512 is a variable length field containing the actual content of the file. Similarly, file 520 may include a header 521 and data 522. However, some files, such as files 530 and 540, may be sparse files that, in one embodiment, may include a header and a marker. For example, file 530 may include a header 531 and a marker 532.

Generally speaking, sparse files consume less storage space than the actual files they represent. However, as indicated in FIG. 5, more space has been allocated for file 530 than is needed to store header 531 and marker 532 to allow sparse file 530 and/or marker 532 to be replaced by additional file code or data without needing to increase the allocated storage space of file 530. In one embodiment, marker 532 may include information identifying a location from which additional code or code data be obtained. File 540 may include a header 541 and a marker 542 that are used in a similar fashion to header 531 and marker 532.

Figure 6:
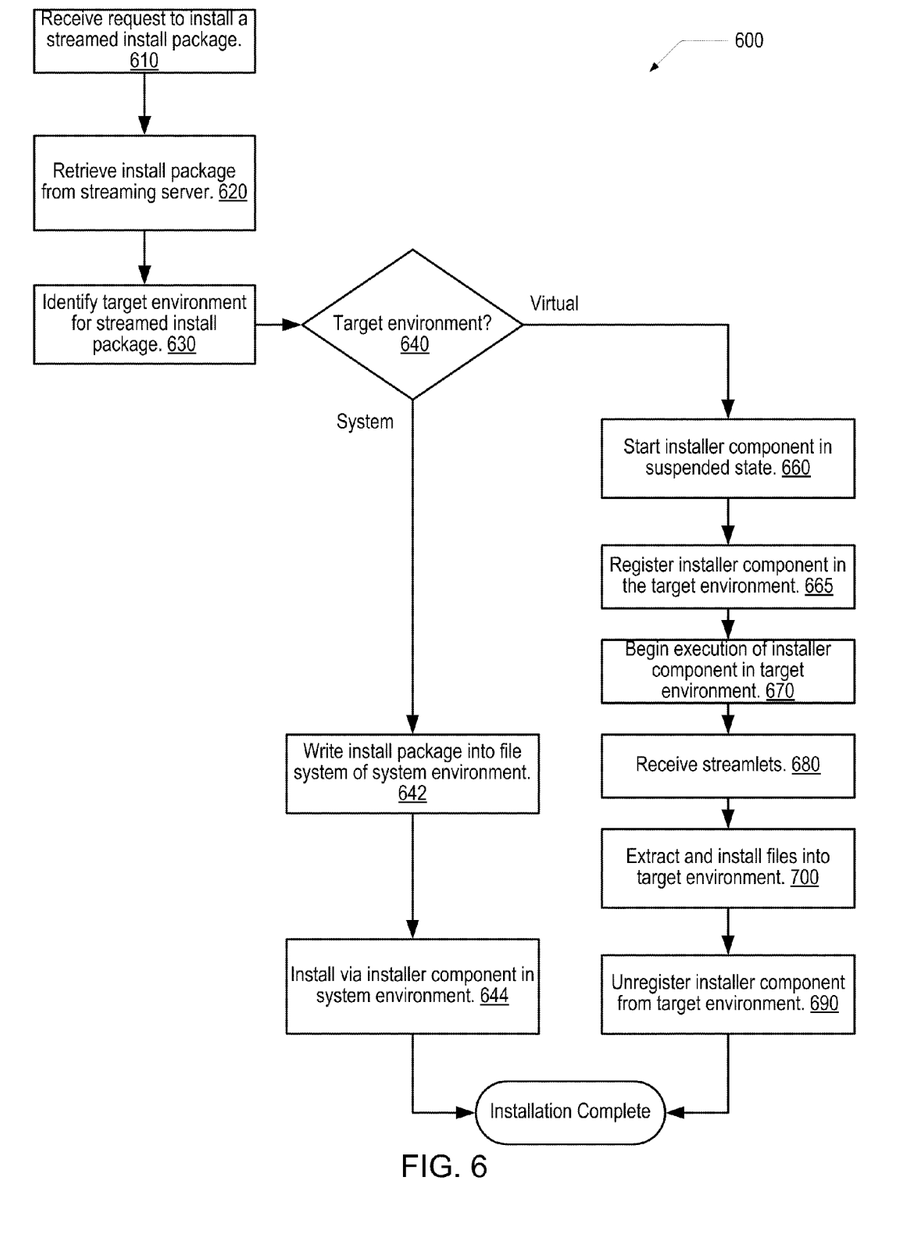
FIG. 6 illustrates one embodiment of a process that may be used to install an install package.

FIG. 6 illustrates one embodiment of a process 600 that may be used to install an install package. Process 600 may begin with reception of a request to install a streamed install package (block 610). In response to the request, an install package may be retrieved from a streaming server (block 620). A target environment for installation of the install package may be identified (block 630). For example, a target environment in which to install a software application may be determined on a client computing system, such as via a user selection. In an alternative embodiment, in order to identify a target environment in which to install a software application, a request may be sent to a streaming server for target environment information. The streaming server may respond to the request by delivering a set of rules that indicate, among other things, whether or not to install a software application into a system environment, a virtual environment or into a particular virtual environment, etc. If the identified target environment is a system (non-virtual) environment (decision block 640), the install package may be written into the file system of the targeted system environment (block 642) and installed into the system environment using an installer component (block 644). For example, the install package may be received as a series of streamlets that are stored in the file system. Files may be extracted from the streamlets and installed in the system environment, completing the installation process.

Alternatively, if the identified target environment is a virtual environment (decision block 640), the installer component may be started in a suspended state (block 660) and subsequently registered in the target virtual environment (block 665), such as by adding an entry that corresponds to the installer component to the process table. Once the installer component has been registered in the target virtual environment, execution of the installer component may begin (block 670). Streamlets may be received and stored in a file system region owned by the target virtual environment (block 680). Files may be extracted from the stored streamlets and installed into the target virtual environment (block 700). Once the files have been installed, the installer component may be unregistered from the target virtual environment (block 690), completing the installation process.

Figure 7:
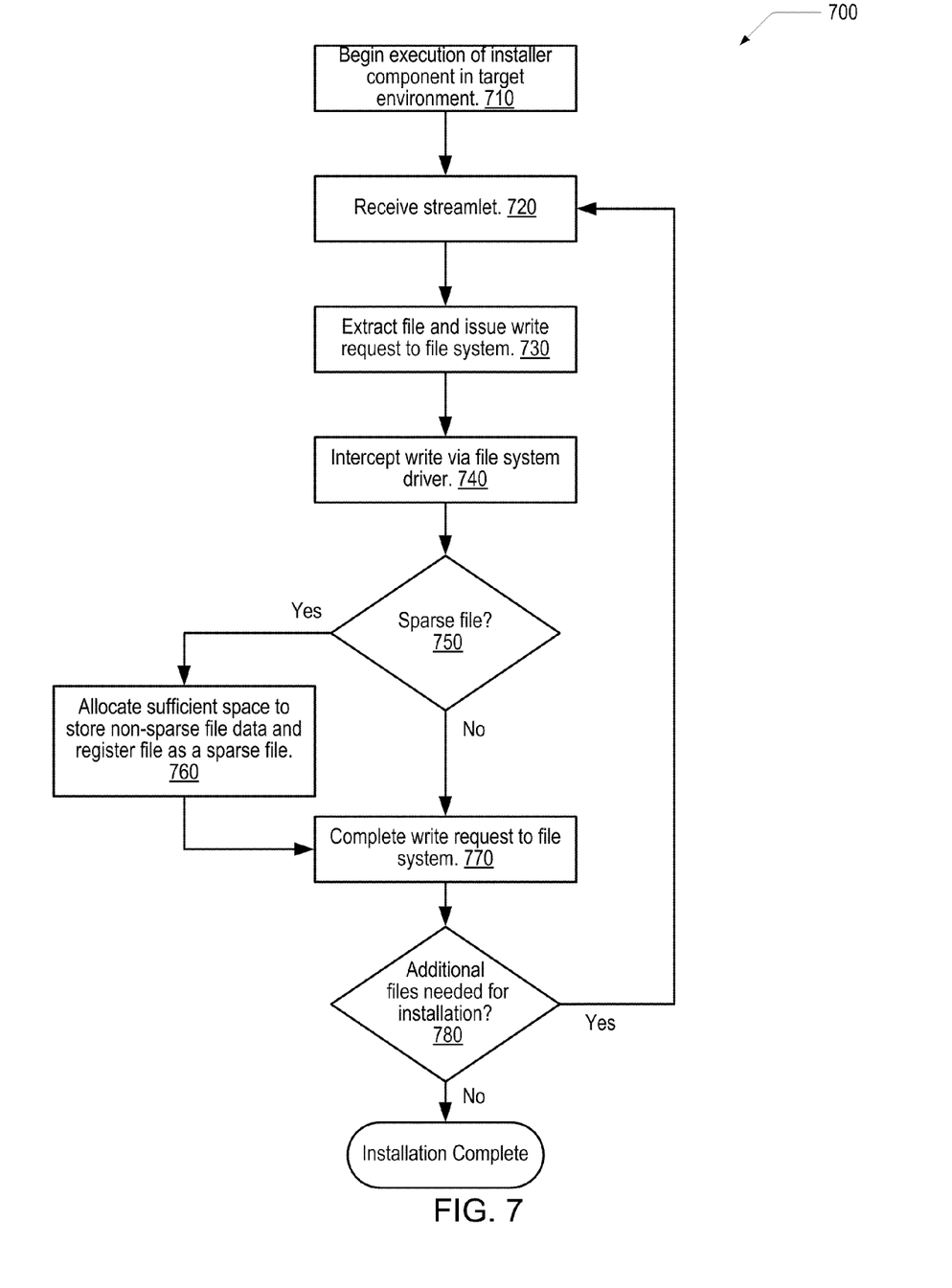
FIG. 7 illustrates one embodiment of a process that may be used to extract and install files from a streamlet source into a target environment.

FIG. 7 illustrates one embodiment of a process 700 that may be used to extract and install files from a streamlet source into a target environment. Process 700 may begin by triggering execution of an installer component in a target virtual environment (block 710). A streamlet may be received (block 720), such as from a streaming server via an application manager. A file may be extracted from the streamlet and a write request issued to write the extracted file to a storage region owned by the virtual environment (block 730). The write request may be intercepted by a file system driver (block 740). The file system driver may determine if the file is a sparse file (decision block 750). If the file is a sparse file, the file system driver may allocate additional space for the file to allow for replacement data to be placed in the file's storage location if and when the file is received and register the extracted file as a sparse file (block 760). After the file space has been allocated, or if the file is not a sparse file, the write request may be completed (block 770). It is noted that if a streamlet contains more than one file, blocks 730, 740, 750, 760, and 770 may be repeated for each file. Once the write request has been completed, if additional files are needed to complete the installation (decision block 780), process 700 may continue at block 720. If no additional files are needed, the installation process is complete.

Figure 8:
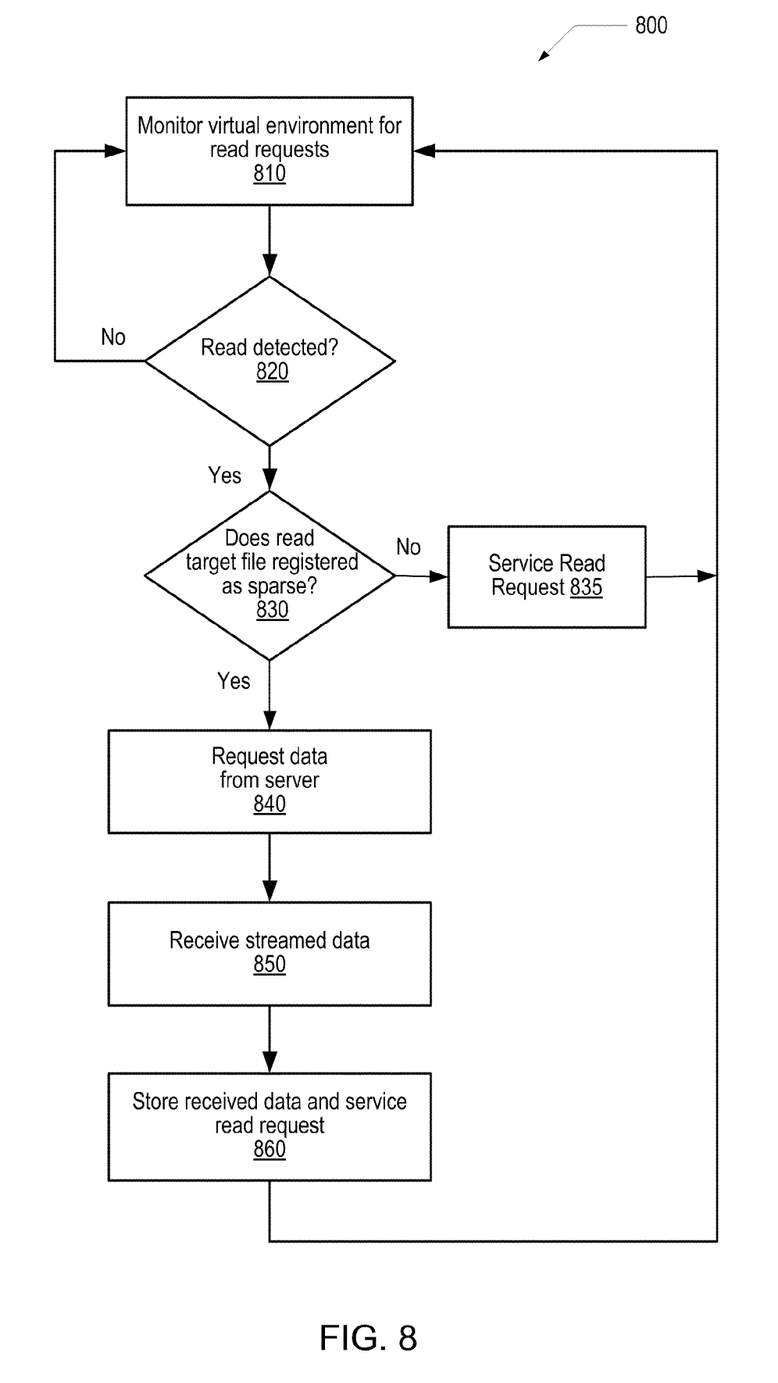
FIG. 8 illustrates one embodiment of a process that may be used to add code or data to sparse files.

FIG. 8 illustrates one embodiment of a process 800 that may be used to add code or data to sparse files. Process 800 may begin with a file system driver monitoring a virtual environment for read requests (block 810). In response to detecting a read request (decision block 820), if the request does not target a file that is registered as a sparse file (decision block 830), the read request may be serviced (block 835) and process 800 may be repeated starting at block 810. If the request targets a file that is registered as, or otherwise indicated to be, a sparse file (decision block 830), a request for a missing data of the sparse file data may be issued (block 840). For example, a request may be issued to an application manager to retrieve replacement data from a streaming server. In one embodiment, detecting that a file includes a marker may be sufficient to determine that the file is a sparse file. In addition, a marker may include information identifying the location from which replacement data may be obtained, such as the address of a streaming server. For example, streamed replacement data may be received (block 850), the received data may be stored into at least a portion of the storage location occupied by the sparse file, and the file un-registered as a sparse file. Additional, the read request may be serviced using the received data (block 860). In one embodiment, the replacement data may replace a marker, or any other portion, of the file. Further, the file may no longer be identified as a sparse file. Once the received data has been written, process 800 may be repeated starting at block 810.

Figure 9:
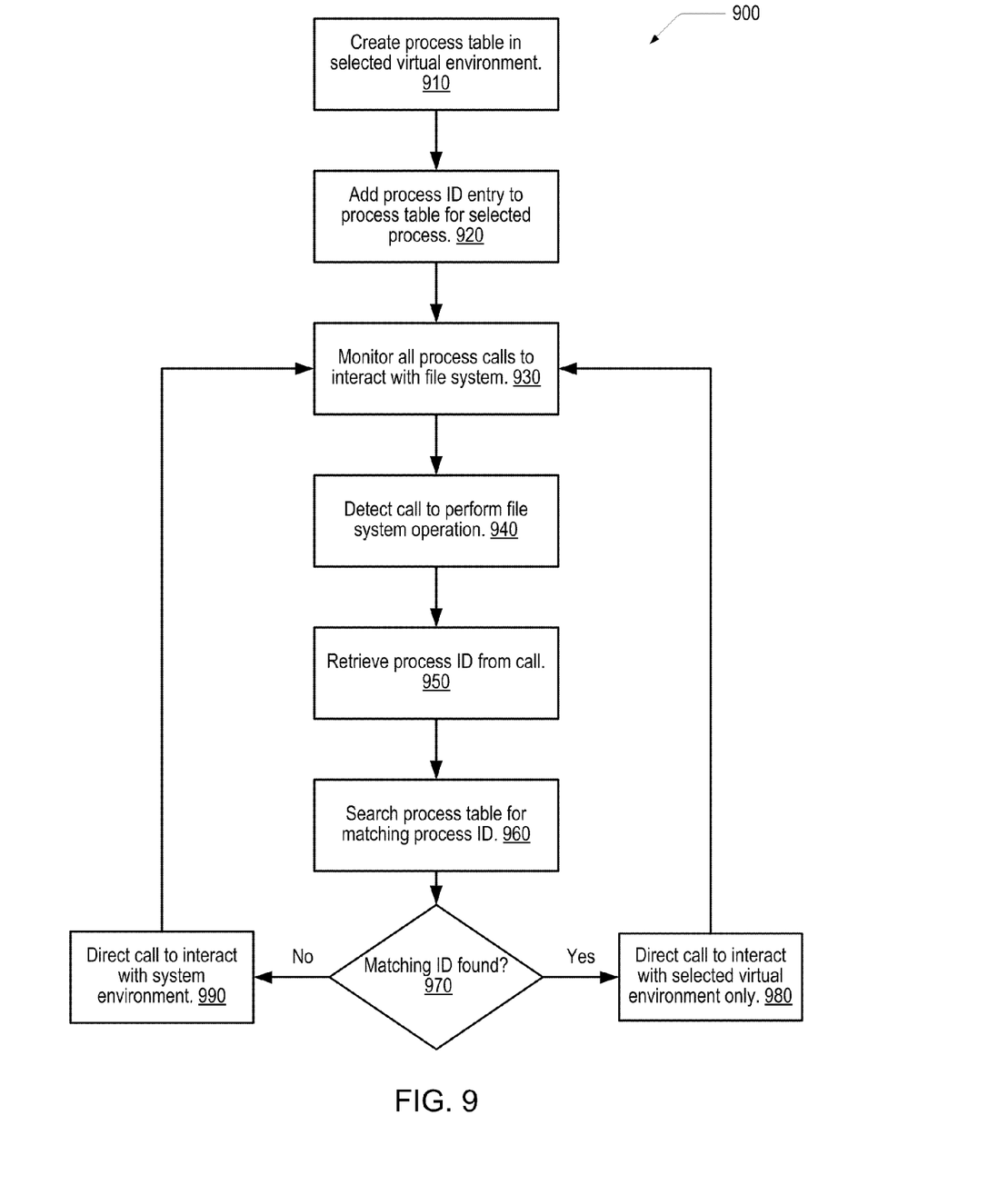
FIG. 9 illustrates one embodiment of a process that may be used to confine the effects of a process to a virtual environment.

FIG. 9 illustrates one embodiment of a process 900 that may be used to confine the effects of a process to a virtual environment. Process 900 may begin with creation of a process table in a selected virtual environment (block 910). Once a process table exists, a process ID may be added to the table for a selected process whose effects are to be confined to the selected virtual environment (block 920). All process calls to interact with a file system may then be monitored (block 930). When a call to perform a file system operation is detected (block 940), a process ID corresponding to the call may be identified (block 950) and the process table searched for a matching process ID (block 960). If a match is found in the process table (decision block 970), the call may be directed to interact with the selected virtual environment only (block 980) and monitoring may continue at block 930. If a match is not found in the process table (decision block 970), the call may be permitted to interact with the system (non-virtual) environment (block 990) and monitoring may continue at block 930.

It is noted that the foregoing flow charts are for purposes of discussion only. In alternative embodiments, the elements depicted in the flow chart may occur in a different order, or in some cases concurrently. Additionally, some of the flow chart elements may not be present in various embodiments, or may be combined with other elements. All such alternatives are contemplated.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated. It is intended that the following claims be interpreted to embrace all such variations and modifications.

What is claimed is:

1. A computing system comprising:
   a server configured to stream an application install package; and
   a client comprising:
   a virtual environment within which processes may execute, and a non-virtual system environment within which processes may execute; and
   a process table which identifies processes configured to run in the virtual environment;
   wherein responsive to a request to install said application in the virtual environment, the client is configured to:
   start an installer component in a suspended state in the non-virtual system environment;
   register the installer component in the virtual environment; and
   resume execution of the installer component in the virtual environment;
   wherein subsequent to resuming execution, the installer component is configured to:
   begin installation of the application in the virtual environment; and
   initiate an attempt to perform an action configured to affect a file system or registry of the non-virtual system environment;
   wherein responsive to detecting said attempt, a virtualization manager is configured to:
   access the process table;
   compare a process ID of the given process to process IDs in the process table;
   permit the given process to access the non-virtual system environment, in response to determining the process table indicates the process ID is not associated with the virtual environment; and
   prevent the given process from accessing the non-virtual system environment, in response to determining the process table indicates the process ID is associated with the virtual environment.

2. The computing system of claim 1, wherein subsequent to installing the application in the virtual environment the client is configured to unregister the installer service from the virtual environment and register the installer service in the non-virtual system environment.

3. The computing system of claim 1, wherein the client is further configured to receive instructions from the server that identify a virtual environment into which to install the install package.

4. The computing system of claim 2,
wherein the server is configured to stream the install package to the client as a series of streamlets;
wherein the installer component is configured to extract data from a streamlet and issue a write request to write the data into the virtual environment; and
a driver outside of the virtual environment is configured to detect the write request.

5. The computing system of claim 4, wherein in response to detecting the write request, the driver is further configured to:
determine if the file is a sparse file; and
if the file is a sparse file:
register the file as a sparse file; and
allocate an amount of storage space for the sparse file that is sufficient to store a non-sparse file that corresponds to the sparse file.

6. The computing system of claim 5,
wherein the sparse file includes a marker identifying a location from which the non-sparse file data may be retrieved; and
wherein in response to detecting a read request to read the sparse file, the driver is configured to retrieve the non-sparse file data from said location.

7. The computing system of claim 1, wherein in response to detecting said attempt and determining the process table indicates the process ID is associated with the virtual environment, the virtualization manager is further configured to redirect said action so that it affects the virtual environment instead of the non-virtual system environment.

8. A computer implemented method of streaming an install package into a virtual environment, the method comprising:
starting an installer component in a suspended state in a non-virtual system environment of a client, said non-virtual system environment being an environment within which processes may execute;
registering the installer component in a virtual environment of the client, said virtual environment being an environment within which processes may execute;
maintaining a process table which identifies processes configured to run in the virtual environment;
resuming execution of the installer component in the virtual environment;
subsequent to resuming execution in the virtual environment, the installer component:
beginning installation of the application in the virtual environment; and
initiating an attempt to perform an action configured to affect a file system or registry of the non-virtual system environment;
a virtualization manager:
detecting the attempt to perform said action;
accessing the process table;
comparing a process ID of the given process to process IDs in the process table;
permitting the given process to access the non-virtual system environment, in response to determining the process table indicates the process ID is not associated with the virtual environment; and
preventing the given process from accessing the non-virtual system environment, in response to determining the process table indicates the process ID is associated with the virtual environment.

9. The method of claim 8, wherein subsequent to installing the application in the virtual environment, the method further comprises unregistering the installer service from the virtual environment and registering the installer service in the non-virtual system environment.

10. The method of claim 9, further comprising receiving instructions from a streaming server that identify the virtual environment into which to install the install package.

11. The method of claim 9, further comprising:
receiving the install package as a series of streamlets;
the installer component extracting data from a received streamlet and issuing a write request to write the data into the virtual environment; and
a driver outside of the virtual environment detecting the write request.

12. The method of claim 11, further comprising in response to detecting the write request, the driver:
determining if the file is a sparse file; and
if the file is a sparse file:
registering the file as a sparse file; and
allocating an amount of storage space for the sparse file that is sufficient to store a non-sparse file that corresponds to the sparse file.

13. The method of claim 12, wherein the sparse file includes a marker identifying a location from which the non-sparse file data may be retrieved, wherein in response to detecting a read request to read the sparse file, the method further comprises retrieving the non-sparse file data from said location.

14. The method of claim 11, wherein the installer component includes an installer service and an installer executable process.

15. A computer readable storage medium storing first program instructions executable by a client computing system to:
start an installer component in a suspended state in a non-virtual system environment of the client, said non-virtual system environment being an environment within which processes may execute;
register the installer component in a virtual environment of the client, the virtual environment being an environment within which processes may execute; and
maintain a process table which identifies processes configured to run in the virtual environment;
resume execution of the installer component in the virtual environment;
wherein subsequent to resuming execution, the installer component on the client comprises program instructions executable to:
begin installation of the application in the virtual environment; and
initiate an attempt to perform an action configured to affect a file system or registry of the non-virtual system environment;
wherein a virtualization manager on the client comprises program instructions executable to:
detect the attempt to perform said action;
access the process table;
compare a process ID of the given process to process IDs in the process table;
permit the given process to access the non-virtual system environment, in response to determining the process table indicates the process ID is not associated with the virtual environment; and prevent the given process from accessing the non-virtual system environment, in response to determining the process table indicates the process ID is associated with the virtual environment.

16. The computer readable storage medium of claim 15, wherein subsequent to installing the application in the virtual environment, the first program instructions are configured to unregister the installer service from the virtual environment and register the installer service in the non-virtual system environment.

17. The computer readable storage medium of claim 15, wherein first program instructions are further executable by a client computing system to:
 receiving the install package from a streaming server as a series of streamlets; and
 receiving instructions from the streaming server computing system that identify a virtual environment into which to install the install package.

18. The computer readable storage medium of claim 16, wherein the installer component is configured to extract data from a streamlet and issue a write request to write the data into the virtual environment; and
 a driver outside of the virtual environment is configured to detect the write request.

19. The computer readable storage medium of claim 18, wherein in response to detecting the write request, the driver is further configured to:
 determine if the file is a sparse file; and
 if the file is a sparse file:
 register the file as a sparse file; and
 allocate an amount of storage space for the sparse file that is sufficient to store a non-sparse file that corresponds to the sparse file.

* * * * *